April 4, 1967 MLADEN MAZURANIC 3,312,475
ALSO KNOWN AS MLADEN MAZURANIC-JANKOVIC
PREPAYMENT APPARATUS FOR THE DISTRIBUTION OF POSTCARDS
CARRYING A SOUND RECORD
Filed Dec. 2, 1963 6 Sheets-Sheet 1
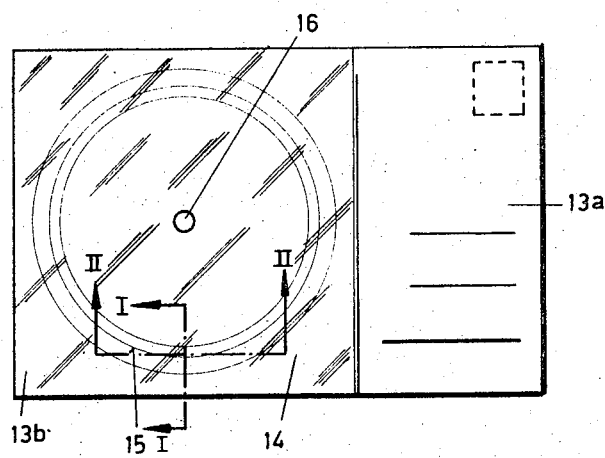
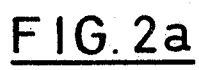
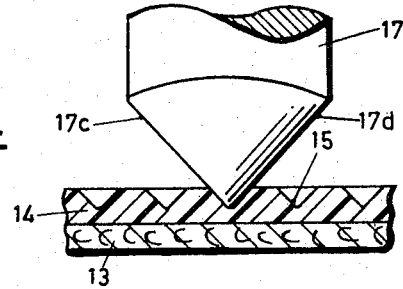
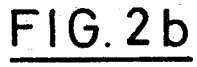
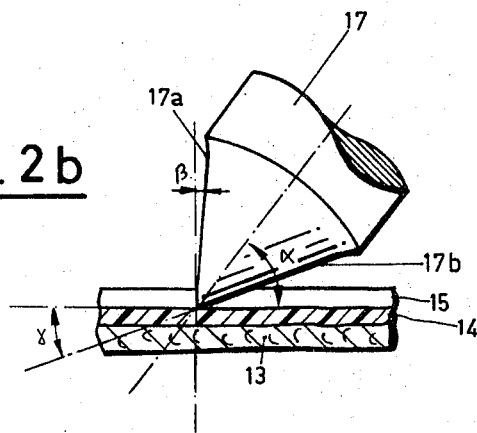

April 4, 1967    MLADEN MAZURANIC    3,312,475
ALSO KNOWN AS MLADEN MAZURANIC-JANKOVIC
PREPAYMENT APPARATUS FOR THE DISTRIBUTION OF POSTCARDS
CARRYING A SOUND RECORD Filed Dec. 2, 1963                             6 Sheets-Sheet 2

April 4, 1967 MLADEN MAZURANIC 3,312,475
ALSO KNOWN AS MLADEN MAZURANIC-JANKOVIC
PREPAYMENT APPARATUS FOR THE DISTRIBUTION OF POSTCARDS
CARRYING A SOUND RECORD
Filed Dec. 2, 1963 6 Sheets-Sheet 3

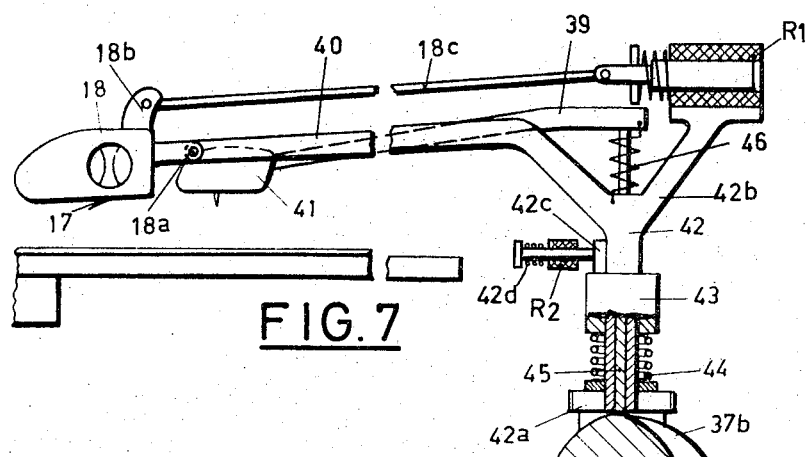
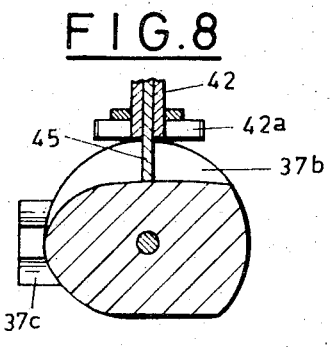
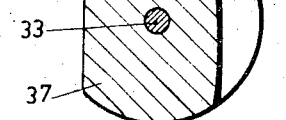
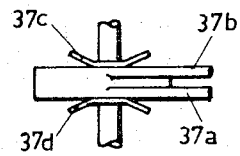
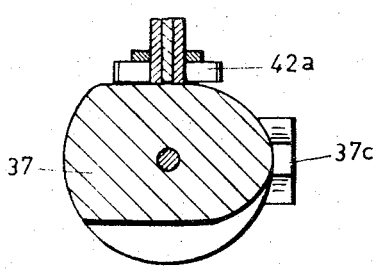

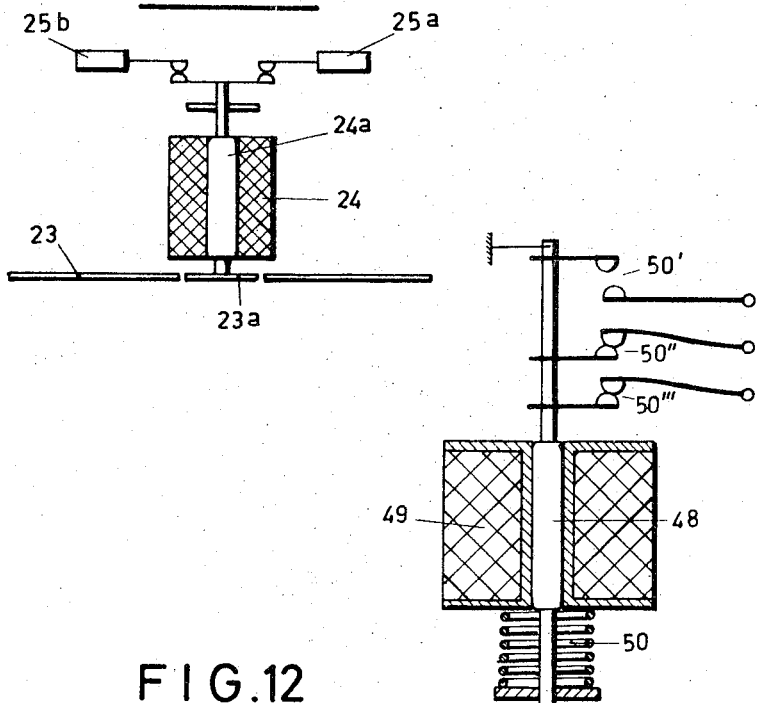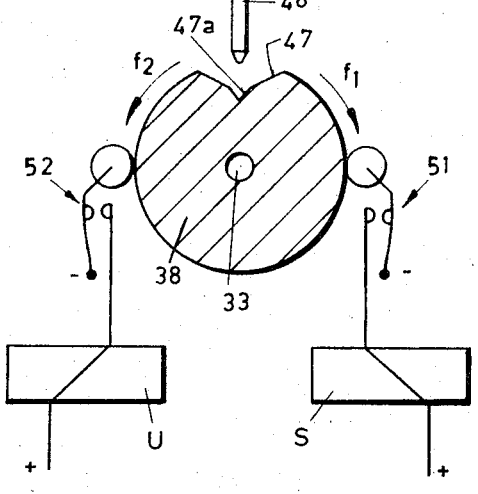

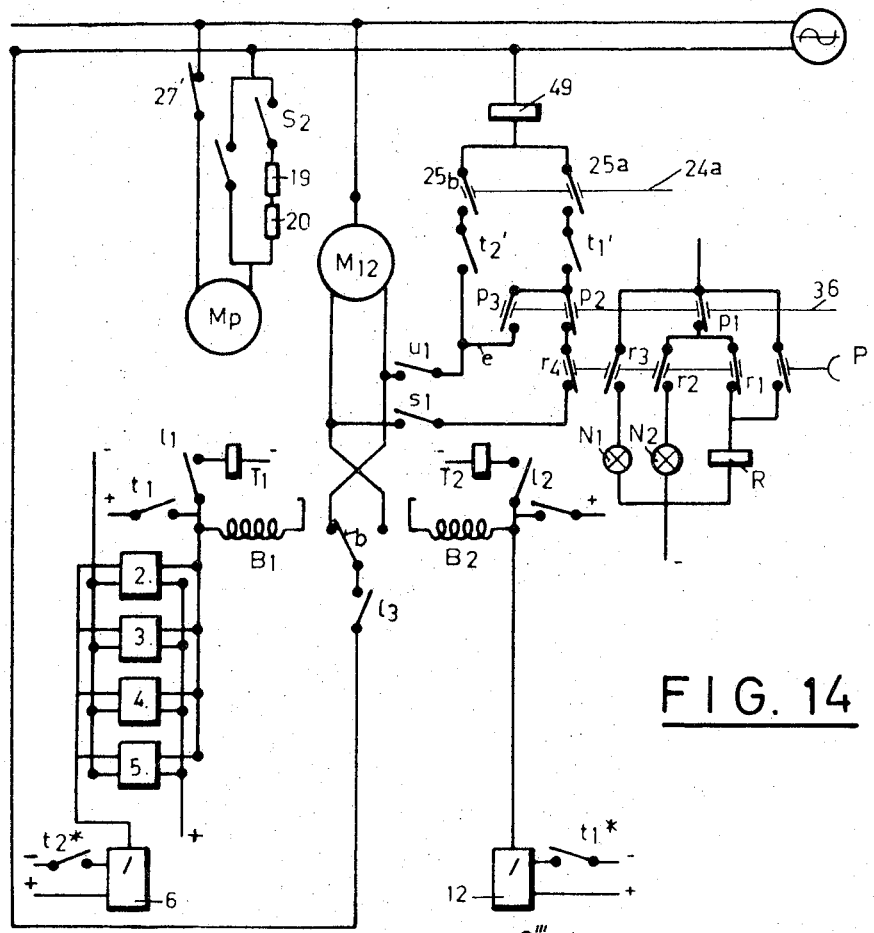
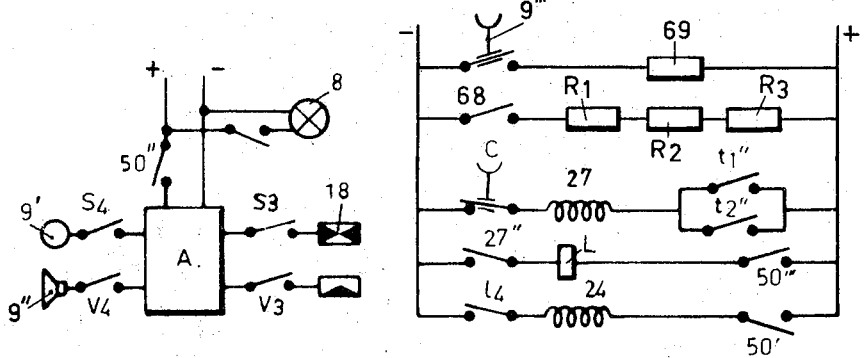
FIG. 14

United States Patent Office 3,312,475
Patented Apr. 4, 1967

3,312,475
PREPAYMENT APPARATUS FOR THE DISTRIBUTION OF POSTCARDS CARRYING A SOUND RECORD
Mladen Mazuranic, also known as Mladen Mazuranic-Jankovic, Geneva, Switzerland, assignor to Pripart S.A., Geneva, Switzerland, a firm
Filed Dec. 2, 1963, Ser. No. 327,411
Claims priority, application Switzerland, Nov. 30, 1962, 14,103
13 Claims. (Cl. 274—1)

The present invention has for its object an arrangement for producing a sound record and mailing it to a third party with a minimum expenditure.

A primary object of the invention consists in a prepayment apparatus for the distribution of postcards carrying a sound record, including, according to the invention, means distributing postcards provided with a surface adapted to carry a record, means for recording sound on such a postcard, means for selecting said postcards and means controlling last-mentioned means, whereby the user is allowed to record himself an acoustic message on a previously selected postcard.

According to a further object of the invention, there is proposed a method for recording sounds on such postcards as provided by a deformation by a heated recording needle of the edges of a groove which has been previously impressed on the postcard surface.

According to an auxiliary object of the invention, said groove is printed within the mass of a sheet of plastic material laid over the postcard in a manner such that the ornamentation carried by said postcard may not be covered or spoiled by said groove.

In the improved apparatus according to the invention, the recording needle is arranged slopingly with reference to the surface of the postcard and its end forms a point cut out so as to allow the free passage inside the groove.

Figure 3:
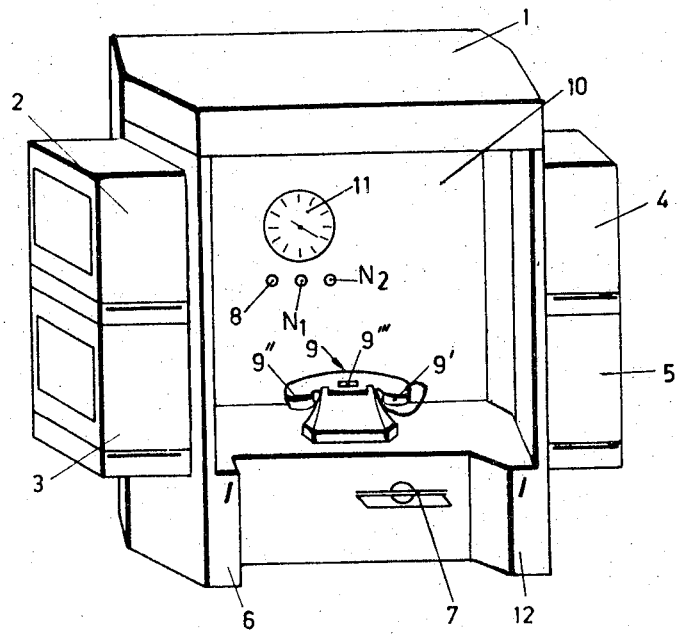
Figure 6:
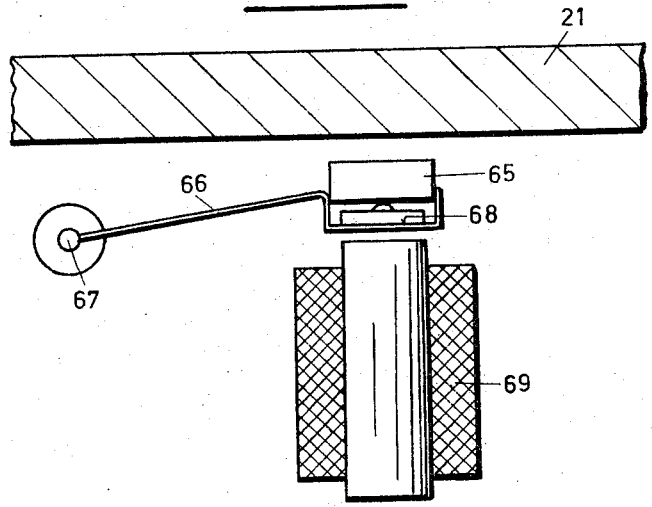
Figure 4:
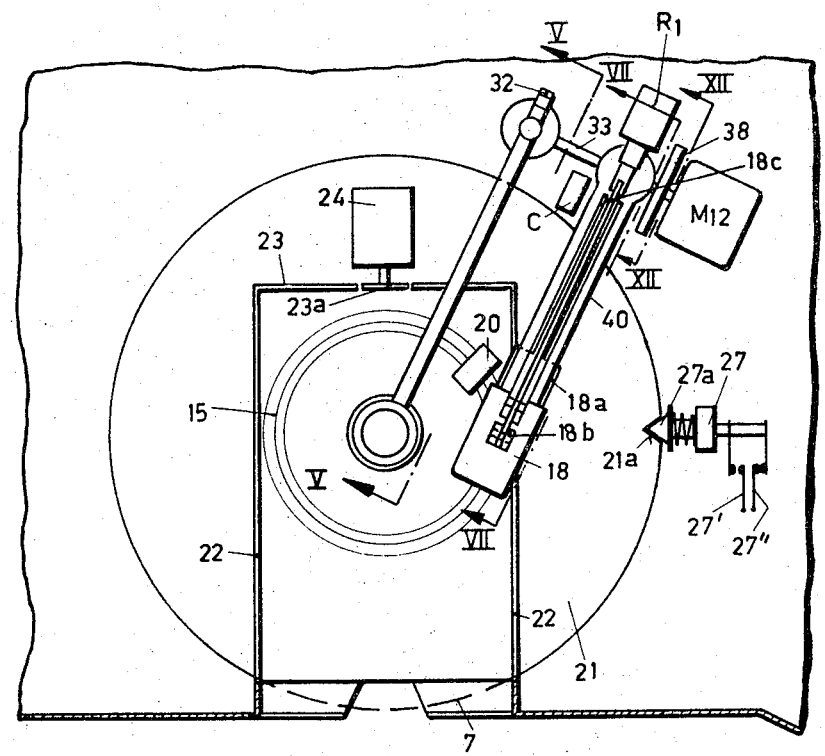
Figure 5:
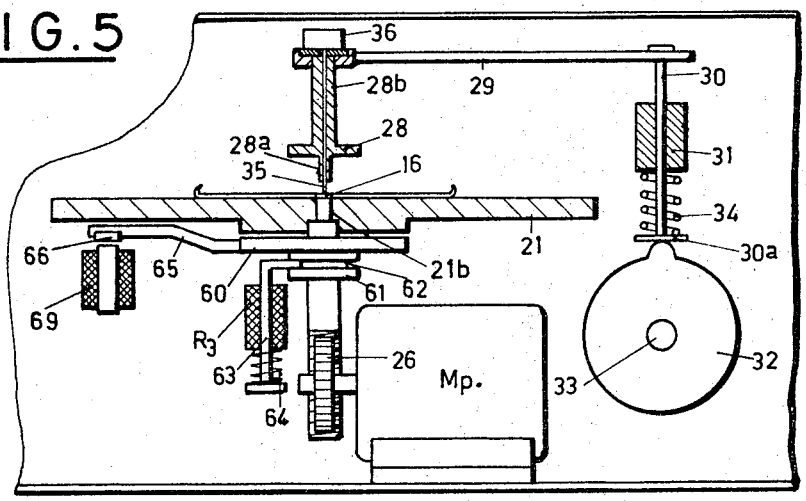

In the accompanying drawings, there is illustrated, by way of example:

In FIG. 1 a plan view of the surface of the postcard which is to carry a record, In FIG. 2a a cross-section on a very large scale through line I—I of FIG. 1 showing the postcard and the tip of a recording needle, In FIG. 2b a cross-section along line II—II of said FIG. 1 at right angles with line I—I, In FIG. 3 a three-quarter view of an apparatus distributing and recording a postcard according to FIG. 1, In FIG. 4 a view from above of the recording and reproducing turn table, In FIG. 5 a partly cross-sectional view through line V—V of FIG. 4, In FIG. 6 a cross-section through line VI—VI of FIG. 5, In FIG. 7 a partly sectional view through line VII—VII of FIG. 4, In FIGS. 8 and 9 a detail of FIG. 7 in two different operative positions, In FIGS. 10 and 11 a cross-section through lines X—X and XI—XI of FIG. 7 respectively, In FIG. 12 a cross-sectional view through line XII—XII of said FIG. 7, In FIG. 13 a plan view of the means provided for the automatic ejection of the postcard, In FIG. 14 a general wiring diagram of the prepayment apparatus executed in accordance with the invention.

The apparatus illustrated in FIGS. 3 to 14 is intended for the sale of postcards of the type illustrated in FIG. 1, for the recording of messages of said postcards and for the acoustic reproduction of such recorded messages. It is of particular interest for tourists and may be erected preferably for instance in railway stations, hotels, restaurants or souvenir shops.

The apparatus comprises (FIG. 3) a cage 1 inside which the various parts required for recording and reproducing messages on postcards are arranged, as described hereinafter. To either side of the case are positioned two pairs of distributors 2, 3; and 4, 5 from which the cards can be obtained upon introduction of a coin at 6 so that the distributing drawer operates if the coin dropped is considered as genuine: this also starts the recording section of the device. 7 is a slot through which a user can drop the postcard delivered into the device where the desired recording is to be made. A lamp 8 shows that he may begin to speak into the microphone 9′ of a telephone 9 arranged in an acoustically insulated recess 10 forming a sort of cabin, 11 is a switch-operating clock indicating the time available for recording; the recording procedure may be interrupted by pressing on a switch 9′′′, which also interrupts transiently the operation of the switch-operated clock 11.

The record thus made may then be reproduced by dropping the card into the slot 7 as in the case of a recording and by introducing a coin into a further slot 12.

The postcards stacked in the distributors 2 to 5 consist of a cardboard support one side of which carries a picture and the other side (FIG. 1) is divided into two parts, the first of which 13a forms the space allowed for the address and stamps while the other, 13b, is coated with a thermoplastic material 14, to form a sheet affixed to the card by gluing or compression, say by means of a press.

This sheet is provided with a spiral groove 15, similar to that of ordinary disc records but with flat sides said grooves surrounding an opening 16 provided both in the card and in the sheet. The groove 15 and the opening 16 are obtained through stamping.

The recording of a message on a postcard is provided by means of a sapphire needle 17 (FIG. 2a) the diameter of which is considerably larger than the breadth of the groove 15, said needle being held slopingly with reference to the upper surface of the cardboard, so that its axis may form therewith an angle $\alpha$ of about 60° (FIG. 2b) in a vertical plane tangent to the grove while the rear section or trailing edge 17a of the needle tip forms a flat surface (i.e., is straight) extending at an angle $\beta$ with reference to a plane perpendicular to the postcard surface, the value of which last-mentioned angle ranges between 3 and 5°, and the front section or leading 17b of the needle tip forms a flat surface (i.e., is straight) extending with reference to the upper surface of the card postcard at an angle $\alpha$ the value of which ranges between about 15 and 20°; the sections 17c and 17d of the needle tip extending between the flat surfaces 17a and 17b are machined in a manner such that the tip of the needle shows in a transverse plane an apical angle the value of which is equal to the angular opening of the groove 15 which latter is generally equal to about 85°. Said grooves are given as a matter of fact a substantially triangular cross-section, while their depth is equal to about $\frac{8}{100}$ of a mm., and their maximum breadth is equal to about $\frac{10}{100}$ of a mm.

As a consequence of this particular shape given to the needle tip, the postcard may be shifted towards the left-hand side of FIG. 2b with reference to the needle 17 without the edges of the groove followed by the tip of the latter being deformed, as long as said tip is not subjected to transverse recording vibrations.

The needle 17 is rigid with a recording head 18 (FIG. 4) operating through electromagnetic or piezoelectric means for instance, which produce more or less marked transverse vibrations depending on the intensity and wave length of the sounds collected by the microphone 9'. Such a microphone is however not sufficient and cannot deform the edges of the groove as in the case of the records sold commercially. The amplitude of the deformations executed is in fact too small for it to be possible to record a message which would be perfectly audible in the case of conventional phonograph and electrophones, the sensitivity of which matches the amplitudes of the oscillations obtained with disc-shaped records.

In the improved recording method according to the invention, the needle 17 is heated for instance by means of an electric resistance or of supersonic waves up to a temperature of about 120 to 150° C. at which temperature the plastic material forming the sheet 14 and constituted preferably by polyvinyl chloride softens slightly whereby the needle is now adapted to deform sufficiently the edges of the groove.

In the embodiment illustrated diagrammatically in FIG. 14, the needle is heated by a resistance 19 surrounding said needle over a fraction of its length.

In certain cases, for instance, when the device is to be located in particularly cold places, the heating action of needle 17 is increased by that of a resistance 20 (FIG. 14) acting directly on the portion of plastic coating of the postcard which is to pass underneath this needle.

The postcard on which the recording is to be made is therefore introduced into the device through the slot 7 (FIG. 4) and is laid on a turn-table 21, between U-shaped guides 22 and 23 secured to said turn-table so as to hold the postcard in position; the guide 23 is provided with a movable section 23a rigid with the core 24a of an electro-magnet 24 (FIG. 13) which ejects the card after the recording or reproducing is finished. This electromagnet carries moreover the movable contact-pieces of two switches 25a and 25b the operation of which is described in detail below.

The turn-table is driven, for instance at a speed of 45 r.p.m., by a motor Mp through a worm forming a speed reducer 26 (FIG. 5). When inoperative, the turn-table is locked by a trigger 27a rigid with the core of an electromagnet 27 and engaging an indentation 21a in the turn-table (FIG. 4).

In its central part, the turn-table 21 shows moreover a recess 21b over which the opening 16 of the postcard is fitted, provided of course that the postcard has been correctly laid on the turn-table (FIG. 5). A bolt 28a is adapted to engage this recess 21b, the bolt downwardly protruding centrally of the flange on the support 28 carried at the end of a horizontal arm 29 which is rigid at its other end with a vertical pin 30 slidingly carried inside a stationary sleeve 31. This pin carries at its lower end a plate 30a which rests on the edge of a cam 32 keyed to a shift 33 driven by a double-rotor motor M12 (FIG. 4) adapted to impart to this cam opposed rotary motions, current being supplied to either rotor as required.

A spring 34 is fitted between the plate 30a and the support 31 so as to lower the arm 29 and to make the plate 28 engage the turn-table when the cam is moved to either side of its inoperative position illustrated in FIG. 5. The arm 29 can however only be lowered if the card has been correctly placed on the turn-table since the bolt 28a and its carrier plate are provided with a cylindrical passage 28b inside which a feeler 35 is fitted slidingly against the action of a spring which is not illustrated, said feeler controlling a switch 36 rigid with the arm 29 and adapted to switch off the motor M12.

The motor M12 drives in addition to the cam 32 two further cams 37 (FIGS. 7–9) and 38 (FIG. 4) also keyed to its shaft. The cam 37 controls the vertical movements of the arms 39 and 40 which can rock horizontally and the first of which is provided with a recording head 18 while the second arm 40 carries a reading or reproducing head 41 (FIG. 7). As to the cam 38, it controls elements of the electric circuits shown in FIG. 14 to be described in detail later on.

As illustrated in FIG. 7, the arm 40 is formed by two parallel sections secured to a sleeve 42 carried in a fixed support 43 over the spring 44, said support surrounding slidingly a vertical stem 45 the upper end of which is rigid with the arm 39. This stem extends between the two sections of the arm 40 and is subjected to a spring which urges it downwardly as illustrated.

The lower ends of the sleeve 42 and of the stem 45 rest on the edge of the cam 37; when the latter is in the angular position shown in FIG. 7, the sleeve and the stem are raised so that neither the needle 17 on the recording head 18, nor that on the reproducing head engage the surface of the postcard on the turn-table 21.

When the cam is shifted clockwise by 90° (FIG. 9), the sleeve 42 and the stem 45 are shifted axially under the action of the springs 44 and 46, which is sufficient for the needle 17 on the recording head 18 to enter into contact with the postcard.

If, on the other hand, the cam 37 is moved counterclockwise by 90° (FIG. 8), the sleeve 42 remains stationary since it is held upwardly by two ribs 37a, 37b projecting along the edges of the cam whereas the stem 45 sinks between these ribs as a result of the pressure exerted by the spring 46, which is sufficient for the needle on the reading head 41 to enter into contact with the postcard.

If a message is to be recorded in the groove 15 of the postcard it is assumed, naturally, that the needle 17 will follow this groove throughout; with a postcard such as that illustrated the needle is automatically guided laterally by the edges of the groove acting on this needle, since the arm 40 carrying the head 18 is pivotally mounted in the support 43 so as to be capable of rocking horizontally.

After recording, the arm 40 lies therefore in an angular position differing from its starting position; this arm should automatically be brought back to its initial position as soon as the recording is at an end. The same applies naturally as regards the reproducing head 41 and its arm 39 the transverse movements of which are directly dependent on those of the arm 40. With the device described, it is sufficient for the arms 39 and 40 to resume their initial angular position (FIGS. 5 and 7) when the cam 37 controlling their vertical movements has returned them to their inoperative position of FIG. 5. In the embodiment described, this cam is provided to this end with two projecting sections 37c, 37d to either side of its upper end (FIG. 11), said projections being incurved symmetrically so as to form two guiding rails for an ovoid cam 42a formed by two shells secured to either side of the lower end of the sleeve 42. This cam 42a therefore follows the sleeve 42 in all its movements, both vertical and rotary so that when the arm 40 which is associated with it is tilted, horizontally in order to follow the groove 15 of the postcard, the cam describes a similar movement through a same angle. The rotary movement of the sleeve 42 naturally takes place in the same direction as the cam 37 whenever the cam is near one of its two extreme positions.

After recording or after reproducing a record, the cam 37 is returned into the position illustrated in FIG. 7; just before this position is reached, the projecting sections 37c, 37d enter into contact with the end of the cam 42a which lies obliquely with reference to the axis of symmetry of the cam 37 so as to return said cam 42a into its starting position (FIGS. 8 and 9).

The unit formed by the projecting sections 37c, 37d and by the ovoid cam 42a is very simple; it requires no special upkeep and its operation is prefectly reliable. It can be made advantageously at least partly of a self-lubricating plastic material. Thus, it is possible to make the projecting sections of a plastic material and the ovoid cam of metal; in another embodiment which is not illustrated, the projecting sections may be integral with the cam 37.

The third cam which is driven by a motor M12 is a cam 38 illustrated in FIG. 12; this cam has a circular shape and is provided along its edge with a notch 47 having slightly oblique edges and the bottom of which is provided with an even more sloping triangular notch 47a. The purpose of this notch is to receive the tip of a stem 48 the medial part 48a of which constitutes the core of an electromagnet or relay 49. This stem controls through its upper end the closing of three switches 50', 50", 50'" the movable contacts of which are rigid with said stem; in the drawing, the electromagnet 49 is shown as energized, the stem 48 being lifted against the action of a closely wound spring 50; in this position, for which the cam 38 is released, the switches 50" and 50'" are closed and the switch 50' is open. The cam 38 is then free to turn to the left or to the right, provided of course the motor M12 is operative; during this movement, the tip of the stem 48 remains in contact with the edge of this cam so that, if the electromagnet is no longer energized and the cam is brought back to its position shown in FIG. 12, the spring 50 urges said stem first into the notch 47 and then into the notch 47a.

The contact-pieces of the switches 50" and 50'" are spaced from each other in a manner such that the former opens when the stem 38 is in the notch 47 and the latter not until said stem has engaged the notch 47a.

To either side of the cam 38 there are arranged the switches 51 and 52 the closing of which controls the energization of the relays S and U respectively; this closing takes place exactly when the cam 38 has executed a rotary movement in the corresponding direction after it has been released as a result of the energization of the relay 49.

The relay S controls five switches S1 to S5; the switch S1 (FIG. 14) allows feeding one of the rotors of the motor M12 and cutting off this supply of energization when the cam 38 has finished its rotary movement through 90° in the direction f1; the cams 32 and 37 have then executed a similar rotation so that on the one hand the postcard is locked on the turn-table 21 by the flange 28, while, on the other hand, the recording needle is in contact with the postcard.

The switch S2 supplies current to the motor Mp as well as to the resistances 19, 20 which are adapted respectively to heat the recording needle and to preheat the thermoplastic coat on the postcard. The supplies continue as long as a switch 27' controlled by the axial position of the movable element 27a of the above-mentioned electromagnet 27 remains open.

The switches S3 and S4 are adapted to couple the recording head 18 or the microphone 9 with an amplifier A which is fed with current through the switch 50" as soon as the relay 49 is energized.

The switch S5 controls the lamp 8 which instructs the user that he may begin speaking into the microphone at the same time as the time switch clock 11 is started.

The relay U controls four switches U1 to U4. The switch U1 supplies the current to the second rotor of the motor M12 and cuts this supply off when the cam has turned by 90° in the direction f2; the needle of the reading head 41 is then in contact with the groove in the postcard 14.

The switch U2 supplies the motor Mp through a circuit connected in parallel with the circuit controlled by the switch S2, this supply remaining operative as long as the switch 27' is closed.

The contact-pieces U3 and U4 connect with the amplifier A the reading head 41 and the earphone 9" of the telephone 9 respectively.

The switch 39'" precedingly referred to is adapted to switch off transiently the recording on a postcard, chiefly so that the user may be given enough time to think about what he is about to record. However, since it is impossible to stop instantaneously the turn-table 21 carrying the postcard, the apparatus described includes an arrangement which allows the turn-table to rotate, while the recording is stopped through a mere upward movement of the recording head 18. Said head 18 is in fact not directly secured to the arm 40 and is pivotally secured to the latter at 18a (FIG. 7). The head 18 is provided with a lug 18b to which is pivotally secured a rod 18c connected with the end of the movable armature of a relay R1 secured to the sleeve 42 by means of a support 42b.

In order to prevent any lateral rocking of the arm 40 during the rising movement of the head 18, said arrangement includes furthermore a brake the shoe 42c of which is secured to the end of the movable armature of a relay R2, a spring 42d urging said brake shoe 42c into a position remote from the surface of the sleeve 42. The energization of the relay R2 produces the application of said brake against the sleeve 42 with a force sufficient for it to produce a locking of said sleeve against angular movements.

In order that the recording may be resumed at the accurate point at which it has been transiently interrupted, it is essential for the turn-table 21 and the needle 17 to return accurately into the relative position occupied by them at the moment of such an interruption. This is made possible with the improved apparatus described as provided by the incorporation of the arrangement illustrated in FIGS. 5 and 6. Over the shaft driving the turn-table 21 is slidingly fitted a plate 60 rigid with a sleeve 61 in which is formed an annular peripheral groove 62 engaged by the bent end of the armature 63 of an electromagnetic relay R3. Said plate 60 is held away from the turn-table 21 by a spring 64 as long as the relay R3 is not energized. In contradistinction, it engages the turn-table 21 under the action of the relay R3 with a force sufficient for it to be driven by said turn-table 21.

The plate 60 is provided with a radial arm 65 adapted to engage the U-shaped opening formed in the end of an elastic blade 66 secured to the casing of the apparatus at 67. The blade 66 is made of a magnetizable material and its position when released is shown in FIG. 6. As long as the arm 65 and the blade 66 occupy said position, energization of the relay R3 has for its sole effect to shift the plate 60 towards the turn-table 21 without said plate 60 being driven into rotation since it is locked by the blade 66.

Between the sides of the U-shaped ends of the blade 66 is arranged a switch 68 controlling the energization of the relays R1, R2, R3, said switch being open as long as the lever 65 engages the blade 66 while it is closed as soon as said lever is released.

Underneath the switch 68 is located an electromagnet 69 the energization of which is controlled by the switch 9'" carried by the telephone microphone. The closing of the switch 9'" produces thus the energization of the electromagnet 69 which draws downwardly the blade 66 forming its armature. The downward movement of said armature produces on the one hand a release of the arm 65 associated with the plate 60 and on the other hand a closing of the switch 68. The relays R1, R2, R3 are consequently energized. Said energization corresponds as described to a raising of the recording head 18, to an angular locking of the arm 40 carrying said head and lastly to the operative application of the plate 60 against the turn-table 21. The recording is therefore interrupted.

As long as the user holds the switch 9'" in its depressed condition, the armature 66 is held in its lowered position while the arm 65 carried along by the plate 60 revolves with the turn-table 21.

When it is desired to resume the recording, it is sufficient to release the switch 9'" so that the electromagnet 69 is no longer energized. The armature 66 rises elastically and returns into the position illustrated in FIG. 6. When the arm 65 moving from the left-hand side of the turn-table as illustrated in FIG. 6 meets the sloping section of the armature 66, it causes said armature to bend, which armature returns into its released position as soon as said arm engages the U-shaped section of said armature 66. The switch 68 opens again, so that the relays R1, R2, R3 are no longer energized. The recording head 18 returns into contacting relationship with the postcard as provided by the elastically operating return spring 46 associated with the relay R1. The brake 42c moves away from the sleeve 42 under the action of the spring 42d and the plate 60 is urged away from the turn-table by the spring 64 associated with the relay R3.

The operation of the arrangement described will now be disclosed, reference being made to the wiring diagram illustrated in FIG. 14.

(a) Recording of a message on a postcard

Current is supplied through the coin-operated contact $t_2$ which is open when the apparatus is used for listening to a recorded message so that any further coin introduced at 6 is refused and returned to the user.

If the contact $t_2$ is also closed, the coin gives rise to an impulse towards the distributors 2 to 5 as a result of which they are released: the user may then choose a postcard.

When a postcard is removed, the corresponding distributor sends an electric impulse through a contact $l_1$ into a relay $T_1$ which is self-energized by the contact $t_1$. This relay $T_1$ controls the closing of two other contacts $t_1'$ and $t_1''$ inserted respectively in the supply circuit of one of the rotors of motor M12, and in that of the electro-magnet 27 which serves for locking the turn-table.

The supply of motor M12 is then controlled by contact 25a, a contact $p_2$ and a contact $r_4$, all inserted in series with contacts $s_1$ and $t_1'$, referred to hereinabove. The switch 25a remains open as long as no postcard has been laid on the turn-table 21 and has not been pushed sufficiently far along the guide 22 in order to come into contact with the guide section 23a and in alignment with the guide 23. It is not until then that the core 24a is finally pressed inside the coil of the ejector electromagnet 24, thus enabling the switches 25a and 25b to close.

Contact $p_2$ is one of the three elementary contacts $p_1$ to $p_3$ forming part of the switch 36 provided on the arm 29 of the device centering the postcard on the turn-table 21. The contacts $p_1$ and $p_2$ remain closed and the contact $p_3$ open each time a postcard is laid accurately on the turn-table 31, i.e. when the feeler 35 does not slide inside the flanged support 28.

The contact $r_4$, controlled by a relay R together with three other contacts $r_1$ to $r_3$, remains closed as long as the relay R is excited, i.e. as long as the contact $p_1$ of the switch 36 remains closed.

Thus, when $t_1'$, $p_2$ and $r_4$ are closed, the motor M12 starts as soon as the switch 25b is closed, i.e. as soon as a postcard is laid on the turn-table in the above-described manner.

At the moment at which the circuit feeding the motor is closed, the electromagnet 49 is energized so that, the cam 38 being released, said motor may turn in the direction $f_1$ illustrated.

At the same time, the amplifier A is energized as a result of the contact 50″ closing: the cam 38 then turns by 90° and stops as a result of the opening of the switch 51 since the relay S, which is then energized, opens the contact $s$. The arm 39 carrying the recording head 18 and that 29 carrying the flanged support 28, are then in their lowered positions; the closing of contact $s_2$ ensures energization of the motor Mp driving the turn-table whereas the contacts $s_3$, $s_4$ and $s_5$, feed respectively the recording head, the microphone 9, the signalling lamp 8 and the clock 11 which is not illustrated in FIG. 14.

The recording continues until the arm 39 meets a terminal switch C which energizes the relay 27 which is self energized by the contact $t_1''$ throughout the recording period. When the relay 27 is released, its armature 27a engages the edge of the turn-table 21 under the action of the spring 27b and enters the notch 21a of the turn-table at a predetermined moment. The shifting of the armature 27a then leads to the opening of contact 27′, thus cutting off the supply of current to the motor Mp and closing a contact 27″ which is connected in series in a circuit including a relay L, controlling the contact $l_1$ previously referred to as well as three other contacts $l_2$, $l_3$ and $l_4$, said circuit including moreover the contact 50‴ which remains closed as long as the rod 48 is held in its raised position by the cam 38 and does not engage the notch 47a in the cam.

The energization of the relay L leads, on the one hand, to the opening of contacts $l_1$ and $l_2$, so that the relay $T_1$ drops and its contacts $t_1$, $t_1'$ and $t_1''$ are open, and on the other hand to the closing of contacts $l_3$ and $l_4$.

The contact $l_3$ controls a second circuit feeding the two rotors of the motor M12 including an electromagnetic selector formed by two coils B1 and B2 which attract a movable armature b, selectively towards the corresponding contact-pieces I and II.

The first contact-piece is connected with the rotor of the motor M12 which revolves in the direction $f_2$, the second contact-piece being connected with the second rotor of this motor.

The coil B1 is connected at one end with the circuit feeding the relay $T_1$ so that the impulse entering this relay during operation of one of the distributors 2 to 5 causes a tilting of the armature b off the second contact-piece engaged by the latter onto the first contact-piece.

The coil B2 is inserted in a circuit connecting the slot 12 with a relay $T_2$, similar to the relay $T_1$ just described, which is energized after a coin has been dropped into this slot and this produces an impulse through contact $l_2$; this energization is maintained as a result of contact $t_2$ closing. Consequently the armature b is shifted back from the first towards the second contact-piece. When the contact $l_3$ closes, the motor M12 is driven into rotation in opposite directions according to the position of the armature b; in the example illustrated, said motor moves in the direction $f_2$ (FIG. 12).

The opening of the switch 51 releases the relay S whereby the contacts $s_2$ to $s_5$ are opened; the microphone and the recording head are no longer connected with the amplifier A and the signalling lamp 8 is extinguished.

The rotation of the motor M12 in the direction $f_2$ returns the portion of the cam 38 provided with a notch 47 into the vicinity of the rod 48 controlled by the relay 49, said rod engaging the edge of the cam throughout its rotation since the relay is no longer energized. Halfway of the travel between the edge of the cam and the notches 47 and 47a, the switch 50′ closes while 50‴ is still closed and 50″ is already open. The relay L is therefore still energized at this moment and its contact $l_4$ is closed so that the current flows through the coil 24 controlling the ejecting guide section 23a and the postcard lying on the turn-table is thrown out as a result of the core 24a being shifted towards the center of the turn-table.

Naturally, during the ejection, the recording head which the cam 37 is about to return into its upper position is sufficiently remote from the turn-table 21 for its needle to have fully disengaged the upper surface of the postcard.

When the rod 48 succeeds in entering the notch 47a of the cam 38, the contact 50‴ opens and the relay 4 is released; the supply of current towards the motor M12 and the ejector 24 is interrupted by the opening of contacts $l_3$ and $l_4$ whereas the contacts $l_1$ and $l_2$ close again so that the device is ready for a new recording or reproduction of a recorded message.

(b) Reproduction of a recorded message

As in the case of a recording, the slot 12 can operate only if a contact $t_1$ inserted in an energization circuit is closed, i.e. when the part of the apparatus which is used for recording is completely inoperative.

The energization of the relay $T_2$ by an impulse sent out when a coin is dropped into the slot 12 results, as above, in a closing of contacts $t_2$, $t_2'$ and $t_2'''$, adapted respectively, to maintain this relay in its energized condition, to ensure the energization of the second rotor of motor M12 and, lastly to close the circuit energizing the relay 27 which releases the turn-table 21 on which the postcard is to be laid; this relay $T_2$ also opens a safety contact $t_2$ inserted in the circuit controlled by the slot 6.

The insertion of a postcard in the guide 22 pushes the core 24a inside its coil 24 and closes as precedingly the contact 25b; the motor M12 revolves then in the direction $f_2$.

The arm 39 carrying the reading head 41 is lowered towards the plate together with the arm 29 which clamps the postcard onto the turn-table through the agency of the flanged support 28.

The rotation of the motor M12 is interrupted when the cam 38 has been shifted by an angular movement of 90° and the relay U is energized when the switch 52 is closed (FIG. 12). This relay controls the opening of the contact $u_1$ and the closing of the contact $u_2$, while the motor Mp still revolves, and $u_3$ and $u_4$ connecting the reading head 41 and the loud-speaker or earphone with the amplifier. After the record has been reproduced, the arm 40 impinges against the switch C and the ejection procedure for the postcard is repeated in the same manner as hereinabove.

The apparatus according to the invention practically prevents any recording of a message on a postcard which is not properly placed on the turn-table 21; when the feeler 35 comes into contact with the postcard, it opens the contacts $p_1$ and $p_2$ and closes the contact $p_3$ which, through the shunt $e$, connects the second rotor of the motor M12 with the mains whereas the first rotor is no longer fed with current. The motor M12 which was previously turning the direction $f_1$ which ensured a downward movement of the arms 29 and 40, turns now in the opposite direction $f_2$ as long as the feeler remains in contact with the postcard; as soon as the feeler leaves the surface of the postcard, the contacts $p_1$ and $p_2$ are again closed while the contact $p_3$ opens. The motor M12 remains, however, stationary because the opening of the contact $p_1$ has released the relay R and because the contacts $r_1$ and $r_4$ of this relay were open whereas the contacts $r_2$ and $r_3$ were closed. At the moment at which the relay R is no longer energized, an alarm signal $N_1$ is first illuminated, which shows that the postcard is not properly positioned; when the contact $p_1$ closes again, another lamp $N_2$ lights up, indicating that the postcard should be properly positioned on the turn-table. This lamp $N_2$ may for instance be positioned underneath a translucent knob which is not illustrated and which protrudes outwardly of the case of the device, near the lamps 8 and $N_1$; the user can start the motor M12 by pressing on this knob which controls the transient closing of a switch P whereby the relay R can again be energized. This leads to a closing of the contacts $r_1$ and $r_4$ and to an opening of the contacts $r_2$ and $r_3$ which results in the relay R remaining energized, the motor M12 starting in the direction $f_1$ and the lamps $N_1$ and $N_2$ being extinguished.

The device can then resume its normal operation.

The above-described circuit which is to prevent recording of messages when a postcard is not properly positioned on the turn-table, is necessary because when the recording needle is heated, it may form a track which is superimposed over the already stamped groove, which would make it impossible to reproduce the record. Moreover, it will be understood that the damage will be still larger when the coat on the postcard is first heated by the resistance 20.

When a record is being reproduced, such a circuit is on the contrary not required because the plastic coat being cold, the edges of the groove are sufficiently hard and can guide the rocking arm 40 while the record is being reproduced and the needle on the head 41 is held within the groove.

Naturally, the apparatus described may, according to a modification which is not illustrated, be provided with an alarm circuit similar to that of the reproducing section and with signalling lamps adjacent the lamps $N_1$ and $N_2$.

The invention is not limited to the above description or illustration; in particular it should be understood that there may be a different number of postcard distributors and that the postcard chosen may also be brought automatically onto the recording turn-table 21 from which it may be ejected by the electromagnet 24.

Moreover, according to a modification which is not illustrated, the record may be reproduced automatically at the end of the recording without the operator having to drop another coin into the slot 12. This slot may, however, be retained nevertheless in order to provide for repeated reproductions of the record.

It should be pointed out that the current for the various parts of the apparatus can also be provided advantageously by a supply of D.C. under a low voltage, say 48 volts, for those circuits which do not feed the motors M12 and Mp, these motors being supplied with alternating current under a voltage of say 110 or 220 volts.

What I claim is:

1. In combination in a prepayment apparatus for distributing postcards and acoustically recording a message thereon, stores of postcards carrying different pictures on one side and a sheet of plastic material provided with a spiral-shaped groove adapted to receive an acoustic recording on the other side by being deformed by a recording needle; means for selecting one of these postcards; means for recording a message including a turn-table adapted to carry the postcard, a recording needle cooperating with the turn-table, an acoustically controlled reading head controlling the needle, coin-operated means delivering a postcard out of a selected store and for starting operation of the recording means upon positioning of said postcard on said turn-table, and means for ejecting said postcard at the end of the recording procedure.

2. In an apparatus as claimed in claim 1, guiding means defining the position to be occupied by said postcard on said turn-table and means checking the actual position of said postcard on said turn-table and preventing operation of the recording means as long as said position differs from a predetermined accurate position.

3. In an apparatus as claimed in claim 1, the provision of means for reproducing and listening to the record-carrying postcard laid on the turn-table and including a reproducing needle adapted to engage the record on the postcard.

4. In an apparatus as claimed in claim 1, means for reproducing and listening to said record-carrying postcard laid on said turn-table and including a reproducing needle adapted to engage the record on said postcard, and means for selectively locking the recording means and the reproducing and listening means during operation respectively of the reproducing and listening means and of the recording means.

5. In an apparatus as claimed in claim 1, lateral and longitudinal guiding means defining the position to be occupied by the postcard on the turn-table, and means checking the actual position of the postcard on the turn-table and preventing operation of the recording means as long as said position differs from a predetermined accurate position.

6. In an apparatus as claimed in claim 1, means for reproducing and listening to the record-carrying postcard laid on the turn-table and including a reproducing needle adapted to engage the record on the postcard and including a reproducing needle-carrying head adapted to cooperate with the record on the postcard, two angularly shiftable arms carrying respectively the recording head and the reproducing head, a vertical vertically shiftable rod for one of said arms, a vertically shiftable sleeve coaxial with said rod carrying the other arm, a cam system controlled by the coin-operated means and ensuring vertical movements of said rod and said sleeve and adapted to hold said rod and sleeve normally in their uppermost position and to provide for their selective dropping into a lower position for operation of the corresponding head and needle, and means controlling the rotation of the cam system for the dropping of said rod and said sleeve selectively.

7. In an apparatus as claimed in claim 1, for use with postcards provided with a hole adapted to register with the center of the turn-table and to form the center of the recording area, the provision of means for reproducing and listening to the record-carrying postcard laid on the turn-table and including a reproducing needle adapted to engage the record on the postcard and including a reproducing needle-carrying head adapted to cooperate with the record on the postcard, two angularly shiftable arms carrying respectively the recording head and the reproducing head, a vertical vertically shiftable rod for one of said arms, a vertically shiftable sleeve coaxial with said rod, carrying the other arm, a cam system controlled by the coin-operated means and ensuring vertical movements of said rod and said sleeve and adapted to hold said rod and sleeve normally in their uppermost position and to provide for their selective dropping into a lower position for operation of the corresponding head and needle, means controlling the rotation of the cam system for the dropping of said rod and said sleeve selectively, guiding means defining the accurate positioning of the postcard on the turn-table, a feeler extending over the center of the turn-table, a horizontal vertically shiftable arm carrying the feeler, means whereby the means controlling the rotation of the cam system control the vertical position of last-mentioned arm to lower the feeler onto the center of the turn-table, and a signalling system controlled by the feeler upon impact of the latter when lowered onto a section of an improperly positioned postcard located outside its hole.

8. In an apparatus as claimed in claim 1, guiding means defining the position to be occupied by the postcard on the turn-table and means checking the actual position of the postcard on the turn-table and preventing operation of the recording means as long as said position differs from a predetermined accurate position, means for reproducing and listening to the recorded postcard laid on the turn-table, an abutment stopping the shifting of the postcard along its guiding means, and means controlled at the end of the recording and of the reproducing procedure and shifting the abutment against the recorded postcard to eject it out of the apparatus.

9. In an apparatus as claimed in claim 1, means for reproducing and listening to the record-carrying postcard laid on the turn-table and including a reproducing needle adapted to engage the record on the postcard, means adapted to lift the operative needle off the turn-table and to interrupt the operation during any recording and reproducing procedure of the apparatus, means storing the data relating to the relative position of the needle and of the turn-table at the moment of an interruption, and means preventing resumption of operation until the needle and turn-table have returned into their above-mentioned relative positions.

10. In an apparatus as claimed in claim 1, for use with postcards provided with a hole adapted to register with the center of the turn-table and to form the center of the recording area, the provision of means for reproducing and listening to the record-carrying postcard laid on the turn-table and including a reproducing needle adapted to engage the record on the postcard and including a reproducing needle-carrying head adapted to cooperate with the record on the postcard, two angularly shiftable arms carrying respectively the recording head and the reproducing head, a vertical vertically shiftable rod for one of said arms, a vertically shiftable sleeve coaxial with said rod, and carrying the other arm, a cam system controlled by the coin-operated means and ensuring vertical movements of said rod and said sleeve and adapted to hold said rod and sleeve normally in their uppermost position and to provide for their selective dropping into a lower position for operation of the corresponding head and needle, means controlling the rotation of the cam system for the dropping of said rod and said sleeve selectively, guiding means defining the accurate positioning of the postcard on the turn-table, a collapsible feeler extending over the center of the turn-table, a horizontal vertically shiftable arm carrying the feeler, means whereby the means controlling the rotation of the cam system control the vertical position of last-mentioned arm to lower the feeler onto the center of the turn-table, a switch operated by the lowered collapsed feeler upon impact of the lowered feeler onto a solid section of a mis-positioned postcard and means whereby the switch when operated returns the three above-mentioned arms into a raised inoperative position.

11. In an apparatus as claimed in claim 10, indicating means controlled by said switch and showing that the three arms have actually returned into their inoperative positions.

12. In an apparatus as claimed in claim 10, means adapted to return said arms into their operative lower positions as soon as the postcard hole has been shifted into registry with the turn-table center.

13. A prepayment apparatus for distributing postcards and acoustically recording a message thereon, comprising stores of postcards carrying corresponding pictures on one side and a surface provided with a spiral-shaped groove adapted to receive an acoustic record on the other side, means for recording a message including a turn-table adapted to carry the postcard, a recording needle cooperating with said turn-table, positioned at an angle with reference to the turn-table and terminating in a frusto-conical tip cut off at the front by a flat surface forming an angle of about 60° with the axis of the needle, at the rear by a flat surface forming an angle of about 70° with the first-mentioned flat surface, and laterally by flat surfaces matching the cross-section of the groove in the postcard surface, an acoustically controlled reading head controlling the needle, and coin-operated means delivering a postcard out of a selected store and starting operation of said recording means upon positioning of the postcard on said turn-table.

References Cited by the Examiner

UNITED STATES PATENTS

| | | |
|---|---|---|
| 1,772,990 | 8/1930 | Feher. |
| 1,849,014 | 3/1932 | McLoren _____ 274—46 |
| 2,148,667 | 2/1939 | Yoskowitz et al. ___ 221—199 X |
| 2,603,491 | 7/1952 | Huenlich et al. _____ 274—17 X |
| 2,628,104 | 2/1953 | Shardlow _____ 274—46 |
| 2,699,720 | 1/1955 | Howey _____ 274—38 X |
| 2,904,869 | 9/1959 | Martel _____ 274—39 X |
| 3,034,792 | 5/1962 | Kenney et al. _____ 274—39 X |
| 3,140,095 | 7/1964 | Henry _____ 274—42 |
| 3,184,242 | 5/1965 | Marcucci et al. _____ 274—38 |
| 3,190,971 | 6/1965 | Lowell _____ 274—37 X |

FOREIGN PATENTS

| | | |
|---|---|---|
| 976,609 | 5/1942 | France. |
| 582,699 | 8/1933 | Germany. |
| 16,129 | 1905 | Great Britain. |

NORTON ANSHER, *Primary Examiner.*

C. B. PRICE, *Assistant Examiner.*